H. O. DAY.
COUPLING FOR RIGIDLY CONNECTING REAR AXLE AND FRAME STRUCTURES OF AUTOMOBILES.
APPLICATION FILED FEB. 28, 1919.
1,382,716.
Patented June 28, 1921.
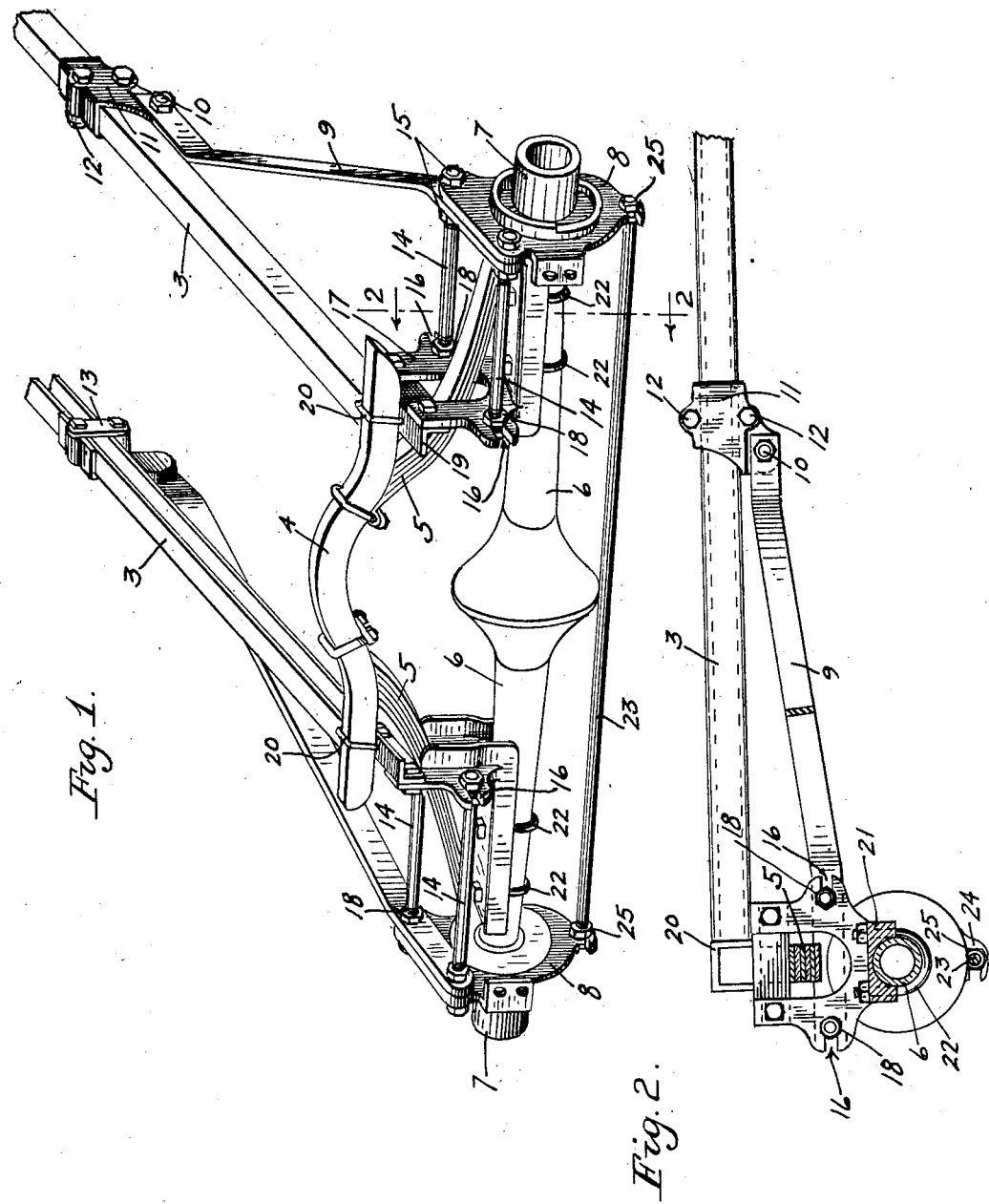
Inventor
Herbert O. Day
By his Attorneys

UNITED STATES PATENT OFFICE.

HERBERT O. DAY, OF ST. PAUL, MINNESOTA, ASSIGNOR, BY MESNE ASSIGNMENTS, TO WOOD-CRAFT COMPANY, OF ST. PAUL, MINNESOTA, A CORPORATION OF MINNESOTA.

COUPLING FOR RIGIDLY CONNECTING REAR AXLE AND FRAME STRUCTURES OF AUTOMOBILES.

1,382,716.              Specification of Letters Patent.     Patented June 28, 1921.

Application filed February 28, 1919. Serial No. 279,736.

*To all whom it may concern:*

Be it known that I, HERBERT O. DAY, citizen of the United States, residing at St. Paul, in the county of Ramsey and State of Minnesota, have invented certain new and useful Improvements in Couplings for Rigidly Connecting Rear Axle and Frame Structures of Automobiles; and I do hereby declare the following to be a full, clear, and exact description of the invention, such as will enable others skilled in the art to which it appertains to make and use the same.

My invention has for its object to provide a specially designed coupling for rigidly connecting the rear axle and frame structures of automobiles, and more particularly those of the Ford type, where such cars are converted from the ordinary use into trucks.

My pending application S. N. 269,037, filed December 31, 1918, entitled "Transmission truck wheels," is an example of the type of traction wheels used to convert a Ford or other car, into a tractor or truck.

In the present instance, the improved coupling is especially designed for application to a Ford car. The invention is illustrated in the accompanying drawings, wherein like characters indicate like parts throughout the several views. Referring to the drawings:—

Figure 1 is a perspective view showing portions of the frame and rear axle, the rear spring and my improved adjustment or coupling; and Fig. 2 is a vertical longitudinal section taken approximately on the line 2—2 of Fig. 1.

Of the standard parts of a Ford car, in so far as they are illustrated, the numeral 3 indicates the side bars of the frame work, the numeral 4 the transverse rear frame bar, the numeral 5 the rear spring, and the numeral 6 the rear axle casing, the said spring being connected between the bar 4 and axle casing in the usual way. In the customary arrangement, of course the spring yieldingly supports the rear portions of the frame from the rear axle casing, but in a tractor or truck, the yielding connection is not desirable, and hence I have designed an improved coupling for rigidly connecting the rear axle casing to the rear portion of the frame, thus holding the rear spring 4 out of action.

In a transmitting tractor wheel, disclosed in my prior patent, I provide non-rotary bearing sleeves 7, through which the rear axle, now shown, is adapted to be passed. These bearing-sleeves 7 are provided with so-called anchoring plates 8, the upper portions of which are rigidly secured to the rear ends of supplemental frame bars 9. The front ends of the said supplemental frame bars 9 are connected by nut equipped bolts 10 to channel-shaped annular brackets 11 that embrace the intermediate portions of the frame bars 3 and as shown, are rigidly but detachably connected thereto by nut equipped bolts 12 and coöperating clamping plates 13. The rigid connection between the rear ends of the supplemental frame bars 9 and the anchoring plates 8 is made by the threaded outer ends of spacing bolts 14 and inner and outer nuts 15.

The threaded inner ends of the spacing bolts 14, as shown, are passed through slots 16 in inner anchoring plates 17, and are adjustably but rigidly connected thereto by inner and outer clamping nuts 18. The anchoring plates 17 are bifurcated or notched so that they clear the spring 5 which is passed therethrough and the upper portions of said plates 17 are bolted or otherwise rigidly secured to the depending flanges of the angle bars 19. The horizontal flanges of the angle bars 19 are rigidly secured to the rear frame bar 4 by nut equipped staples 20 that embrace said bar 4, and are passed through the said angle bars. The said inner anchoring plates 17 are cast integral with or otherwise rigidly secured to base portions 21 that are channeled or formed to fit the top of the axle casing 6, and are rigidly secured thereto by nut equipped staples 22. Preferably also the lower portions of the outer anchoring plates 8 are connected to the ends of a transverse tie-rod 23, the threaded ends of which are passed through slotted projections 24 of said plates 8, and are provided with inner and outer clamping nuts 25.

With the couplings above described, it is evident in the first place, that the rear axle structure is rigidly connected to the rear portion of the frame structure, and the outer anchoring plates 8 are rigidly connected against rotation and also against lateral movements. However, as a further important feature, the said outer anchoring plates 8 are made independently adjustable laterally, by adjusting the nuts on spacing bolts 14. The nuts on the tie-rod 23 will also have to be correspondingly adjusted, but the adjustment of the nuts on the spacing-bolts 14 provides for lateral adjustment of either one of the anchoring plates 8 and their sleeves 7 without changing the adjustment of the other anchoring plate 8 or its sleeve. This is highly important because in the application of transmitting traction wheels, such as noted, these traction wheels require independent lateral adjustment to set the same in proper alinement and to otherwise adjust the same to transmitting gears and devices. Obviously also, these couplings may be very easily and quickly applied to automobiles of the Ford type or to other automobiles, for the purpose as stated.

What I claim:

1. The combination with a frame and a rear axle casing of a motor-propelled vehicle, of coupling devices rigidly connecting said frame and rear axle casing and locking the same against vertical springing movements, the one, in respect to the other, and anchoring members associated with the ends of the said casing and rigidly secured to the respective coupling devices.

2. The combination with a frame and rear axle casing of a motor propelled vehicle, of couplings rigidly connecting the two, sleeve-equipped anchoring plates rigidly connected to said couplings, the said anchoring plates being independently adjustable laterally in respect to the corresponding couplings.

3. The combination with a frame and rear axle casing of a motor propelled vehicle, of couplings rigidly connecting the two sleeve-equipped anchoring plates rigidly connected to said couplings, the said anchoring plates being independently adjustable laterally in respect to the corresponding couplings, and a tie-rod adjustably connected to said anchoring plates at its outer ends.

4. The combination with a frame and rear axle casing of a motor propelled vehicle, of couplings rigidly connecting the two, sleeve-equipped anchoring plates rigidly connected to said couplings, and supplemental bars rigidly connected to said anchoring plates at the rear ends and anchored to the sides of the main frame at their front ends.

5. The combination with the main frame and the rear axle casing of a motor propelled vehicle, of inner anchoring plates rigidly secured to the rear of said main frame and having the base flanges rigidly secured to said axle casing, outer anchoring plates, spacing bolts rigidly connecting said inner and outer anchoring plates and having nuts for permitting independent lateral adjustments of said outer plates.

6. The combination with the main frame and the rear axle casing of a motor propelled vehicle, of inner anchoring plates rigidly secured to the rear of said main frame and having the base flanges rigidly secured to said axle casing, outer anchoring plates, spacing bolts rigidly connecting said inner and outer anchoring plates and having nuts for permitting independent lateral adjustments of said outer plates, supplemental frame bars rigidly secured to said outer anchoring plates at their rear ends and anchored to the sides of said main frame at their front ends.

7. The combination with the main frame and the rear axle casing of a motor propelled vehicle, of inner anchoring plates rigidly secured to the rear of said main frame and having the base flanges rigidly secured to said axle casing, outer anchoring plates, spacing bolts rigidly connecting said inner and outer anchoring plates and having nuts for permitting independent lateral adjustments of said outer plates, supplemental frame bars rigidly secured to said outer anchoring plates at their rear ends and anchored to the sides of said main frame at their front ends, and a tie-rod adjustably connecting said outer anchoring plates.

8. The combination with the main frame and the rear axle casing of a motor propelled vehicle, of inner anchoring plates rigidly secured to the rear of said main frame and having the base flanges rigidly secured to said axle casing, outer anchoring plates, spacing bolts rigidly connecting said inner and outer anchoring plates and having nuts for permitting independent lateral adjustments of said outer plates, the said inner anchoring plates having openings through which a transverse rear spring may be passed.

In testimony whereof I affix my signature in presence of two witnesses:

HERBERT O. DAY.

Witnesses:
 CLARA DEMAREST,
 BERNICE G. BAUMANN.